US008506896B2

(12) United States Patent
Hofte et al.

(10) Patent No.: US 8,506,896 B2
(45) Date of Patent: Aug. 13, 2013

(54) AUTOMATIC DISHWASHING PRODUCT

(75) Inventors: Paulus Antonius Augustinus Hofte, Astene (BE); Pedro Vincent Vandecappelle, Wetteren (BE); Fernando Solache Leon, Newcastle upon Tyne (GB); Lucy Michaela Sellers, London (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/091,418

(22) Filed: Apr. 21, 2011

(65) Prior Publication Data

US 2011/0262318 A1 Oct. 27, 2011

(30) Foreign Application Priority Data

Apr. 23, 2010 (EP) .................................... 10160969

(51) Int. Cl.
*B01D 15/00* (2006.01)

(52) U.S. Cl.
USPC ........... 422/271; 422/261; 422/266; 422/269; 422/270; 422/272

(58) Field of Classification Search
USPC .................. 422/266, 261, 269, 270, 271, 272
See application file for complete search history.

(56) References Cited

U.S. PATENT DOCUMENTS 3,880,765 A 4/1975 Watson
4,000,093 A 12/1976 Nicol et al.
4,246,612 A 1/1981 Berry et al.
4,340,766 A 7/1982 Klahr et al.
4,760,025 A 7/1988 Estell et al.
4,810,410 A 3/1989 Diakun et al.
4,965,012 A 10/1990 Olson
5,114,611 A 5/1992 Van Kralingen et al.
5,227,084 A 7/1993 Martens et al.
5,244,594 A 9/1993 Favre et al.
5,528,867 A 6/1996 Thompson
5,576,281 A 11/1996 Bunch et al.
5,593,648 A * 1/1997 Christie et al. ................ 422/266
5,679,630 A 10/1997 Baeck et al.
5,695,679 A 12/1997 Christie
5,698,046 A 12/1997 St. Laurent et al.
5,763,385 A 6/1998 Bott et al.
5,824,532 A 10/1998 Barnett et al.

(Continued)

FOREIGN PATENT DOCUMENTS

DE 101 58 604 A1 6/2003
DE 10 2007 056920 A1 5/2009

(Continued)

OTHER PUBLICATIONS

U.S. Appl. No. 13/091,418, filed Apr. 21, 2011, Hofte, et al.

(Continued)

*Primary Examiner* — Regina M Yoo

(74) *Attorney, Agent, or Firm* — Tiffany M. Zerby; Steven W. Miller

(57) ABSTRACT

An automatic dishwashing product comprising a multi-dosing detergent delivery device comprising a housing (101, 110) for receiving therein a detergent holder (102) and a detergent holder (102) accommodating a plurality of detergent doses (104, 106) wherein the doses comprises at least two different types of detergent compositions, a first compositions comprising a halogen bleach and a second composition comprising enzymes and a bleach scavenger.

6 Claims, 12 Drawing Sheets

(56) References Cited

U.S. PATENT DOCUMENTS

| | | | |
|---|---|---|---|
| 5,856,164 | A | 1/1999 | Outtrup et al. |
| 5,989,169 | A | 11/1999 | Svendsen et al. |
| 6,093,562 | A | 7/2000 | Bisgard-Frantzen et al. |
| 6,187,576 | B1 | 2/2001 | Svendsen et al. |
| 6,204,232 | B1 | 3/2001 | Borchert et al. |
| 6,312,936 | B1 | 11/2001 | Poulose et al. |
| 6,403,355 | B1 | 6/2002 | Hagihara et al. |
| 6,462,007 | B1 * | 10/2002 | Pieroni et al. ................. 510/224 |
| 6,599,871 | B2 | 7/2003 | Smith |
| 6,605,458 | B1 | 8/2003 | Hansen et al. |
| 6,638,748 | B2 | 10/2003 | Hatada et al. |
| 7,141,403 | B2 | 11/2006 | Outtrup et al. |
| 7,262,042 | B2 | 8/2007 | Weber et al. |
| 7,472,710 | B2 * | 1/2009 | Jowett et al. .................... 134/93 |
| 7,985,569 | B2 | 7/2011 | Aehle et al. |
| 2004/0065670 | A1 | 4/2004 | Morgan et al. |
| 2005/0236420 | A1 * | 10/2005 | Jowett et al. .................. 221/248 |
| 2008/0132625 | A1 | 6/2008 | Niehaus et al. |
| 2008/0293604 | A1 | 11/2008 | Gibis et al. |
| 2008/0293610 | A1 | 11/2008 | Shaw et al. |
| 2009/0075855 | A1 | 3/2009 | Gibis et al. |
| 2009/0239778 | A1 | 9/2009 | Gentschev et al. |
| 2010/0016203 | A1 | 1/2010 | Warkotsch et al. |
| 2010/0031978 | A1 * | 2/2010 | Housmekerides et al. ..... 134/84 |
| 2010/0104488 | A1 | 4/2010 | Housmekerides et al. |
| 2010/0154832 | A1 | 6/2010 | Zipfel et al. |
| 2010/0160204 | A1 | 6/2010 | Zipfel et al. |
| 2011/0053819 | A1 | 3/2011 | Preuschen et al. |
| 2011/0059517 | A1 | 3/2011 | Augustinus et al. |

FOREIGN PATENT DOCUMENTS

| | | | |
|---|---|---|---|
| DE | 10 2008 026932 | A1 | 12/2009 |
| EP | 0 481 547 | A1 | 4/1992 |
| WO | WO 94/02597 | A1 | 2/1994 |
| WO | WO 00/60060 | A2 | 10/2000 |
| WO | WO 2008/053178 | A1 | 5/2003 |
| WO | WO 2006/002643 | A2 | 1/2006 |
| WO | WO 2009/021867 | A2 | 2/2009 |

OTHER PUBLICATIONS

U.S. Appl. No. 13/091,437, filed Apr. 21, 2011, Hofte, et al.
International Search Report, 15 Pages, Jul. 11, 2011.

* cited by examiner

AUTOMATIC DISHWASHING PRODUCT

TECHNICAL FIELD

The present invention is in the field of automatic dishwashing. In particular it relates to an automatic dishwashing product comprising a multi-dosing detergent delivery device capable of delivery two different compositions in the same dishwashing operation. The product of the invention adds convenience and improved cleaning to automatic dishwashing.

BACKGROUND OF THE INVENTION

The automatic dishwashing product designer is always looking for ways to simplify the dishwashing task and at the same time to improve the cleaning performance provided by automatic dishwashing. The present invention attempts to tackle these issues.

SUMMARY OF THE INVENTION

According to a first aspect of the invention there is provided an automatic dishwashing product. The product comprises a multi-dosing detergent delivery device. The device comprises: i) a housing for receiving therein a detergent holder; and ii) a detergent holder for accommodating a plurality of detergent doses. The detergent holder accommodates a plurality of at least two different types of detergent compositions, a first composition comprising halogen bleach and a second composition comprising enzymes and bleach scavenger. The device would deliver a dose of the first composition and a dose of the second composition in each automatic dishwashing operation, preferably the delivery of the two compositions into the dishwashing machine is sequential, having at least 4 minutes, preferably at least 5 minutes between the delivery of the first and second compositions.

Preferably the detergent holder is replaceable or refillable. Once all the detergent doses have been used the holder can be replaced by a new holder or it can be filled with new doses. Especially preferred from an easiness of use viewpoint are replaceable detergent holders.

By “multi-dosing detergent delivery device” is meant a device capable of delivering one or more detergent doses over a plurality of automatic dishwashing operations without human intervention, i.e. the user places the device in the automatic dishwashing machine and the device delivers the doses over a number of operations. Once the detergent doses are finished the detergent holder can be refilled or replaced.

The product of the invention provides easiness of use and also outstanding cleaning benefits.

The first composition comprises a halogen bleach, preferably sodium dichloroisocyanurate, and preferably an alkalinity source, the alkalinity source contributes to the hydration of the soils and helps the bleaching provided by the chlorine bleach. It is also preferred that the first composition comprises a surfactant for soil suspension and anti-redeposition of soils.

The second composition comprises enzymes and a bleach scavenger, preferably the bleach scavenger is thiosulfate. The bleach scavenger would neutralize the effect of the bleach thereby protecting the enzymes. It has now been surprisingly found that the bleach scavenger does not need to be delivered before the enzymes to achieve enzyme protection.

The compositions for use in the product of the invention can comprise phosphate builders, preferably as part of the second composition, but in a preferred embodiment they are free of phosphate builders, i.e. comprises less than 5%, preferably less than 1% and especially less than 0.1% of phosphate builders.

Preferably the second composition comprises a non-phosphate builder, a polymer and a surfactant.

Preferably the device comprises a mono-dimensional actuating means for providing movement of the holder relative to the housing. By “mono-dimensional” is herein meant that the movement happens in only one plane as opposite to more than one as the case is with the device disclosed in WO 2008/053178. In ’178 device the indexing means needs to move firstly in one plane and secondly in a second plane perpendicular to the first one to deliver a dose in each dishwashing operation. The mono-dimensional actuating means of the device of the present invention allows for devices of simpler construction than the devices of the prior art and allows for more space efficient geometries, such as planar geometry. The device of the invention is suitable for the delivery of different doses at different points of the dishwashing operation. ’178 device seems only be suitable for the delivery one dose per dishwashing operation. The next dose is only ready for delivery in the next dishwashing operation.

Preferably, the actuating means comprises a guided means and a driving means. Preferably the driving means comprises a thermally reactive element. Whilst the thermally reactive element may be any of a memory metal/memory alloy, thermal bimetal, bimetal snap element or shape memory polymer, it is most preferably a wax motor. A wax motor is a small cylinder filled with a heat sensitive wax which expands upon melting and contracts upon solidifying. This expansion of the wax can be used by the driving means to drive the guided means forward.

The thermally reactive element is preferably designed to react at temperatures between 25° C. and 55° C., more preferably 35° C. to 45° C. The thermally reactive element preferably has a hysteresis effect. This delays the operation of the thermal element to ensure that the device is not reset by the fluctuating temperatures that can be found in the different cycles of an automatic dishwashing operation but is only reset once the machine has carried out a full dishwashing operation.

Preferably the thermally reactive element has an activation temperature of from about 35° C. to about 45° C. and a de-activation temperature of from about 25° C. to about 33° C. For the wax motor the melting and solidification profile of the wax can be used to achieve the desired hysteresis, because certain waxes show a slow solidification compared to melting.

The guided means are driven by the driving means. The guided means preferably comprise a following means and a track to accommodate the following means, i.e. the path taken by the following means is dictated by the track. The track preferably has a zig-zag configuration in which each up and down path corresponds with a full dishwashing operation. To deliver x detergent doses over x dishwashing operations the zig-zag track needs to have x paths forwards and x paths downwards.

The zig-zag track preferably can be used in a circular pattern which leads to a circular movement of the detergent holder or it can be used in a linear pattern which leads to a linear movement of the detergent holder. A wave pattern or combinations of arc segments and linear patterns can be used to accommodate specific designs and movements of the detergent holder.

It should be noted that the track can be integrated in one of the permanent component of the housing and the motion of this component can then be transferred to the detergent holder via mechanical means or the track can be integrated directly into the detergent holder so that after insertion of the holder the following means engage with the track. The track can be manufactured via injection molding, thermoforming, vacuum casting, etching, galvanizing sintering, laser cutting or other techniques known in the art.

The following means travels alternatively forwards and backwards within the track, powered by the driving means. Preferably, the actuating means further comprises returning means that helps the driving means to return to its initial position once the appropriated conditions are achieved in the automatic dishwashing machine (for example, when the temperature is below about 30° C. in the case of the driving means comprising a wax motor, the wax would contract and the returning means would take the driving means to its initial position). The returning means could for example be a biasing spring or flexible element with sufficient spring force to push the piston in the wax motor back to its initial position when the wax solidifies and therefore contracts.

The advancement of the detergent holder is accomplished by the combination of the driving means, the guided means and if present the returning means. This combination allows for the delivery of two different doses at two different times of the dishwashing operation.

For instance the first dose in the detergent holder can be readily exposed at the start of the wash cycle or get exposed to the wash water or it can be ejected from the detergent holder early in the wash cycle when the temperature slowly rises in the dishwasher and the wax motor starts to expand. The second dose can be exposed or ejected when the wax motor is further expanded when the dishwasher heats up further or during the cold rinse cycles when the first contraction starts. At the end of the wash cycle the complete contraction moves the detergent holder to the next dose ready for the next wash cycle.

It should be noted that the configuration of the track and the angles of its zig-zag pattern determine the movement of the detergent holder and therefore the movement and desired release points of detergent doses can be pre-dictated by this track. This enables large design flexibility in the delivery of the detergent doses at various times during a dishwashing operation. Even a sequential release of three or more doses can be achieved by the use of this kind of tracks.

Preferably, the track comprises slots and ramps. The role of the ramps is to guide the movement of the detergent holder in one direction only. When the temperature increases the following means are driven through the track powered by the driving means and move over the ramp into the first slot. These slots prevent that the following means return through the same path in the track upon contraction of the driving means. As such the followings means are forced to follow the desired return path in the track and translate this movement into a further movement of the detergent holder. At the end of the contraction the following means are driven over a second ramp into the next slot and move the detergent holder further.

To enable the following means to move up over the ramps and down into the slots the following means can be designed to pivot either by a spring loaded pin or by a pivot point to keep the following means at all times in the track.

Preferably, the track comprises harbours. The role of the harbours is to allow further expansion or contraction of the driving means without causing further movement of the detergent holder and to prevent the build-up of high forces in the system when the driving means reaches its maximum expansion or contraction. For instance with a wax motor with a total expansion stroke of 15 mm, the harbours enable to use only the expansion from 5 mm to 10 mm to generate movement of the detergent holder while in the first 5 mm or last 5 mm of the stroke the following means are kept in the harbours and therefore the detergent holder is kept in the same position. This feature helps to overcome the large variation in dishwashing machine cycles and temperature profiles and enable a very specific and pre-defined movement of the detergent holder.

The device is preferably a stand-alone device. By "stand-alone" is herein meant that the device is not connected to an external energy source.

The device of the present invention is preferably of a planar geometry (ie., a disc, a square, a rectangle, etc). Planar geometry is more space efficient than any tri-dimensional geometry, thereby leaving more free space in the dishwasher for the items to be washed.

According to a method aspect of the invention, there is provided a method of automatic dishwashing comprising the step of using the automatic dishwashing product of the invention to sequentially deliver in an automatic dishwashing operation the first and the second composition. By "sequentially deliver" is herein meant that the two compositions are delivered at different points on time. Preferably the second composition is delivered at least about 3 minute, more preferably at least about 4 minutes and especially at least about 5 minutes after the delivery of the first composition.

The method of the invention provides outstanding benefits in terms of cleaning and convenience of use.

temperature less than 30-34° C. wax contracts return stroke via bias spring) and in the expanded (hot) position (i.e.; temperature greater than 36-38° C. wax expands stroke up to 15 mm).

Figure 14:
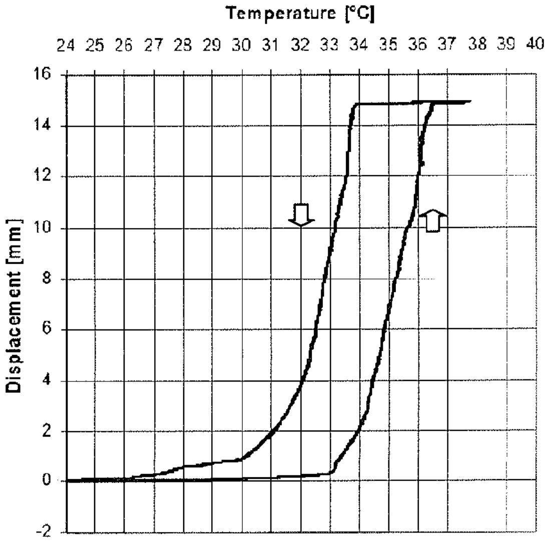

FIG. 14 shows a graph illustrating the hysteresis profile of the actuation temperature of the wax motor during an expansion (heating) and contraction (cooling) cycle.

DETAILED DESCRIPTION OF THE INVENTION

The present invention envisages an automatic dishwashing product and a method of automatic dishwashing using the product of the invention.

Halogen Bleach

Halogen bleaches suitable for use herein include chlorine, bromine, chlorine dioxide, chlorite salts, etc. Preferred halogen bleaches are hypohalite salts. Suitable hypohalite bleaches may be provided by a variety of sources, including bleaches that lead to the formation of positive halide ions and/or hypohalite ions, as well as bleaches that are organic based sources of halides such as chloroisocyanurates. Suitable hypohalite bleaches for use herein include the alkali metal and alkaline earth metal hypochlorites, hypobromites, hypoiodites, potassium and sodium dichloroisocyanurates, potassium and sodium trichlorocyanurates, N-chloroimides, N-chloroamides, N-chloroamines and chlorohydantoins. For the bleaching compositions herein, the preferred hypohalite bleaches among those described above are the alkali metal or alkaline earth metal of chloroisocyanurates selected from the group consisting of sodium, potassium, magnesium, lithium, calcium and mixtures thereof. Sodium dichloroisocyanurate is especially preferred for use herein.

The first composition preferably comprises from about 1% to about 40%, more preferably from about 5% to about 30% and especially from about 10 to about 20% by weight of the composition of halogen bleach.

Bleach Scavenger

Suitable bleach scavengers herein are anions selected from the group consisting of reducing materials like sulfite, bisulfite, thiosulfite, thiosulfate, iodide, nitrite, etc. and antioxidants like carbamate, ascorbate, etc. and mixtures thereof. Outstanding benefits have been obtained with thiosulfate, in particular with sodium thiosulfate.

Other bleach scavengers useful herein include ammonium sulfate, and primary and secondary amines of low volatility such as ethanolamines, preferably monoethanolamine, amino acids and their salts, polyamino acids and their salts, fatty amines, glucoseamine and other aminated sugars. Specific examples include tris(hydroxymethyl) aminomethane, monoethanol amine, diethanol amine, triethanolamine, sarcosine, glycine, iminodiacetic acid, lysine, ethylenediamine diacetic acid, 2,2,6,6-tetramethyl piperinol, and 2,2,6,6-tetramethyl piperinone.

Other bleach scavengers include phenol, phenol sulfonate, 2,2-biphenol, tiron, and t-butyl hydroquinone. Preferred are meta-polyphenols such as resorcinol, resorcinol monoacetate, 2,4-dihydroxybenzoic acid, 3,5-dihydroxybenzoic acid, 2,4-dihydroxyacetophenone, BHT and TMBA.

Enzyme

Enzyme Related Terminology

Nomenclature for Amino Acid Modifications

In describing enzyme variants herein, the following nomenclature is used for ease of reference: Original amino acid(s):position(s):substituted amino acid(s).

According to this nomenclature, for instance the substitution of glutamic acid for glycine in position 195 is shown as G195E. A deletion of glycine in the same position is shown as G195*, and insertion of an additional amino acid residue such as lysine is shown as G195GK. Where a specific enzyme contains a "deletion" in comparison with other enzyme and an insertion is made in such a position this is indicated as *36D for insertion of an aspartic acid in position 36. Multiple mutations are separated by pluses, i.e.: S99G+V102N, representing mutations in positions 99 and 102 substituting serine and valine for glycine and asparagine, respectively. Where the amino acid in a position (e.g. 102) may be substituted by another amino acid selected from a group of amino acids, e.g. the group consisting of N and I, this will be indicated by V102N/I.

In all cases, the accepted IUPAC single letter or triple letter amino acid abbreviation is employed.

Protease Amino Acid Numbering

The numbering used herein is numbering versus the so-called BPN' numbering scheme which is commonly used in the art and is illustrated for example in WO00/37627.

Amino Acid Identity

The relatedness between two amino acid sequences is described by the parameter "identity". For purposes of the present invention, the alignment of two amino acid sequences is determined by using the Needle program from the EMBOSS package (http://emboss.org) version 2.8.0. The Needle program implements the global alignment algorithm described in Needleman, S. B. and Wunsch, C. D. (1970) J. Mol. Biol. 48, 443-453. The substitution matrix used is BLOSUM62, gap opening penalty is 10, and gap extension penalty is 0.5.

The degree of identity between an amino acid sequence of and enzyme used herein ("invention sequence") and a different amino acid sequence ("foreign sequence") is calculated as the number of exact matches in an alignment of the two sequences, divided by the length of the "invention sequence" or the length of the "foreign sequence", whichever is the shortest. The result is expressed in percent identity. An exact match occurs when the "invention sequence" and the "foreign sequence" have identical amino acid residues in the same positions of the overlap. The length of a sequence is the number of amino acid residues in the sequence.

Preferred enzyme for use herein includes a protease. Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from *Bacillus*, such as *Bacillus lentus, B. alkalophilus, B. subtilis, B. amyloliquefaciens, Bacillus pumilus* and *Bacillus gibsonii* described in U.S. Pat. No. 6,312,936 B1, U.S. Pat. No. 5,679,630, U.S. Pat. No. 4,760,025, U.S. Pat. No. 7,262,042 and WO09/021,867.

(b) trypsin-type or chymotrypsin-type proteases, such as trypsin (e.g., of porcine or bovine origin), including the *Fusarium* protease described in WO 89/06270 and the chymotrypsin proteases derived from *Cellumonas* described in WO 05/052161 and WO 05/052146.

(c) metalloproteases, including those derived from *Bacillus amyloliquefaciens* described in WO 07/044,993A2.

Preferred proteases include those derived from *Bacillus gibsonii* or *Bacillus Lentus.*

Especially preferred proteases for the detergent of the invention are polypeptides demonstrating at least 90%, preferably at least 95%, more preferably at least 98%, even more preferably at least 99% and especially 100% identity with the wild-type enzyme from *Bacillus lentus*, comprising mutations in one or more, preferably two or more and more preferably three or more of the following positions, using the BPN' numbering system and amino acid abbreviations as illustrated in WO00/37627, which is incorporated herein by reference: 68, 87, 99, 101, 103, 104, 118, 128, 129, 130, 167, 170, 194, 205 & 222 and optionally one or more insertions in the region comprising amino acids 95-103.

Preferably, the mutations are selected from one or more, preferably two or more and more preferably three or more of the following: V68A, N87S, S99D, S99SD, S99A, S101G, S103A, V104N/I, Y167A, R170S, A194P, V205I and/or M222S.

Most preferably the protease is selected from the group comprising the below mutations (BPN' numbering system) versus either the PB92 wild-type (SEQ ID NO:2 in WO 08/010,925) or the subtilisin 309 wild-type (sequence as per PB92 backbone, except comprising a natural variation of N87S).

(i) G118V+S128L+P129Q+S130A
(ii) G118V+S128N+P129S+S130A+S166D
(iii) G118V+S128L+P129Q+S130A+S166D
(iv) G118V+S128V+P129E+S130K
(v) G118V+S128V+P129M+S166D
(vi) G118V+S128F+P129L+S130T
(vii) G118V+S128L+P129N+5130V
(viii) G118V+S128F+P129Q
(ix) G118V+S128V+P129E+S130K+S166D
(x) G118V+S128R+P129S+S130P
(xi) S128R+P129Q+S130D
(xii) S128C+P129R+S130D
(xiii) S128C+P129R+S130G
(xiv) S101G+V104N
(xv) N76D+N87S+S103A+V104I
(xvi) V68A+N87S+S101G+V104N
(xvii) S99SD+S99A
(xviii) N87S+S99SD+S99A Suitable commercially available protease enzymes include those sold under the trade names Alcalase®, Savinase®, Primase®, Durazym®, Polarzyme®, Kannase®, Liquanase®, Ovozyme®, Neutrase®, Everlase® and Esperase® by Novozymes A/S (Denmark), those sold under the tradename Maxatase®, Maxacal®, Maxapem®, Properase®, Purafect®, Purafect Prime®, Purafect Ox®, FN3®, FN4®, Excellase® and Purafect OXP® by Genencor International, those sold under the tradename Opticlean® and Optimase® by Solvay Enzymes, those available from Henkel/Kemira, namely BLAP (sequence shown in FIG. 29 of U.S. Pat. No. 5,352,604 with the following mutations S99D+S101 R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D)—all from Henkel/Kemira; and KAP (*Bacillus alkalophilus* subtilisin with mutations A230V+S256G+S259N) from Kao. Preferred for use herein in terms of performance is a dual protease system, in particular a system comprising a protease comprising S99SD+S99A mutations (BPN' numbering system) versus either the PB92 wild-type (SEQ ID NO:2 in WO 08/010,925) or the subtilisin 309 wild-type (sequence as per PB92 backbone, except comprising a natural variation of N87S). and a DSM14391 *Bacillus Gibsonii* enzyme, as described in WO 2009/021867 A2.

Preferred levels of protease in the second composition of the invention include from about 0.1 to about 10, more preferably from about 0.5 to about 5 and especially from about 1 to about 4 mg of active protease per grams of composition.

Preferred enzyme for use herein includes alpha-amylases, including those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCIB 12289, NCIB 12512, NCIB 12513, DSM 9375 (U.S. Pat. No. 7,153,818) DSM 12368, DSMZ no. 12649, KSM AP1378 (WO 97/00324), KSM K36 or KSM K38 (EP 1,022,334). Preferred amylases include:

(a) the variants described in WO 94/02597, WO 94/18314, WO96/23874 and WO 97/43424, especially the variants with substitutions in one or more of the following positions versus the enzyme listed as SEQ ID No. 2 in WO 96/23874: 15, 23, 105, 106, 124, 128, 133, 154, 156, 181, 188, 190, 197, 202, 208, 209, 243, 264, 304, 305, 391, 408, and 444.

(b) the variants described in U.S. Pat. No. 5,856,164 and WO99/23211, WO 96/23873, WO00/60060 and WO 06/002643, especially the variants with one or more substitutions in the following positions versus the AA560 enzyme listed as SEQ ID No. 12 in WO 06/002643: 26, 30, 33, 82, 37, 106, 118, 128, 133, 149, 150, 160, 178, 182, 186, 193, 203, 214, 231, 256, 257, 258, 269, 270, 272, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, preferably that also contain the deletions of D183* and G184*.

(c) variants exhibiting at least 90% identity with SEQ ID No. 4 in WO06/002643, the wild-type enzyme from *Bacillus* SP722, especially variants with deletions in the 183 and 184 positions and variants described in WO 00/60060, which is incorporated herein by reference.

(d) variants exhibiting at least 95% identity with the wild-type enzyme from *Bacillus* sp. 707 (SEQ ID NO:7 in U.S. Pat. No. 6,093,562), especially those comprising one or more of the following mutations M202, M208, 5255, R172, and/or M261. Preferably said amylase comprises one or more of M202L, M202V, M2025, M202T, M2021, M202Q, M202W, S255N and/or R172Q. Particularly preferred are those comprising the M202L or M202T mutations.

Preferred α-amylases include the below variants of SEQ ID No. 12 in WO 06/002643:

(a) one or more, preferably two or more, more preferably three or more substitutions in the following positions: 9, 26, 149, 182, 186, 202, 257, 295, 299, 323, 339 and 345; and (b) optionally with one or more, preferably four or more of the substitutions and/or deletions in the following positions: 118, 183, 184, 195, 320 and 458, which if present preferably comprise R118K, D183*, G184*, N195F, R320K and/or R458K.

Preferred amylases include those comprising the following sets of mutations:

(i) M9L+, M323T;
(ii) M9L+M202L/T/V/I+M323T;
(iii) M9L+N195F+M202L/T/V/I+M323T;
(iv) M9L+R118K+D183*+G184*+R320K+M323T+R458K;
(v) M9L+R118K+D183*+G184*+M202L/T/V/I; R320K+M323T+R458K;
(vi) M9L+G149A+G182T+G186A+M202L+T257I+Y295F+N299Y+M323T+A339S+E345R;

(vii) M9L+G149A+G182T+G186A+M2021+T257I+Y295F+N299Y+M323T+A339S+E345R;

(viii) M9L+R118K+G149A+G182T+D183*+G184*+G186A+M202L+T257I+Y295F+N299Y+R320K+M323T+A339S+E345R+R458K;

(ix) M9L+R118K+G149A+G182T+D183*+G184*+G186A+M2021+T257I+Y295F+N299Y+R320K+M323T+A339S+E345R+R458K;

(x) M9L+R118K+D183*+D184*+N195F+M202L+R320K+M323T+R458K;

(xi) M9L+R118K+D183*+D184*+N195F+M202T+R320K+M323T+R458K;

(xii) M9L+R118K+D183*+D184*+N195F+M2021+R320K+M323T+R458K;

(xiii) M9L+R118K+D183*+D184*+N195F+M202V+R320K+M323T+R458K;

(xiv) M9L+R118K+N150H+D183*+D184*+N195F+M202L+V214T+R320K+M323T+R458K; or (xv) M9L+R118K+D183*+D184*+N195F+M202L+V214T+R320K+M323T+E345N+R458K.

(xvi) M9L+R118K+G149A+G182T+D183*+G184*+G186A+N195F+M202L+T257I+Y295F+N299Y+R320K+M323T+A339S+E345R+R458K Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, POWERASE®, FUNGAMYL® and BAN®, (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS® and PURASTAR OXAM® (Genencor International Inc., Palo Alto, Calif.) and KAM® (Kao, 14-10 Nihonbashi Kayabacho, 1-chome, Chuo-ku Tokyo 103-8210, Japan). Amylases especially preferred for use herein include NATALASE®, STAINZYME®, STAINZYME PLUS®, POWERASE® and mixtures thereof.

Additional Enzymes

Additional enzymes suitable for use in the composition of the invention can comprise one or more enzymes selected from the group comprising hemicellulases, cellulases, cellobiose dehydrogenases, peroxidases, proteases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, amylases, and mixtures thereof.

Cellulases

The composition of the invention preferably comprises other enzymes in addition to the protease and/or amylase. Cellulase enzymes are preferred additional enzymes, particularly microbial-derived endoglucanases exhibiting endo-beta-1,4-glucanase activity (E.C. 3.2.1.4), including a bacterial polypeptide endogenous to a member of the genus *Bacillus* which has a sequence of at least 90%, preferably 94%, more preferably 97% and even more preferably 99% identity to the amino acid sequence SEQ ID NO:2 in U.S. Pat. No. 7,141,403B2 and mixtures thereof. Preferred commercially available cellulases for use herein are Celluzyme®, Celluclean®, Whitezyme® (Novozymes A/S) and Puradax HA® and Puradax® (Genencor International).

Preferably, the second composition of the invention comprises at least 0.01 mg of active amylase per gram of composition, preferably from about 0.05 to about 10, more preferably from about 0.1 to about 6, especially from about 0.2 to about 4 mg of amylase per gram of composition.

Preferably, the protease and/or amylase for use in the second composition of the invention are in the form of granulates, the granulates comprise less than 29% of efflorescent material by weight of the granulate or the efflorescent material and the active enzyme (protease and/or amylase) are in a weight ratio of less than 4:1.

By "efflorescent material" is herein understood a material that in its anhydrous form can take water to become hydrated and it can easily give up the hydration water when it is placed in a drier or warmer environment. Preferably the efflorescent materials for use in the composition of the invention have a difference in density between the anhydrous and hydrated form of at least 0.8 g/cm3, more preferably at least 1 g/cm3 and especially at least 1.2 g/cm3. This difference in densities provides a mechanism to break particle:particle crystal bridges that have formed as a result of water condensing as the powder temperature fell below the dew point associated with that powder. As the temperature increases following a period of cooling (as in a temperature cycle), the hydrated material forming a crystal bridge between particles reverts to the anhydrous (or less hydrated) form. The higher crystal density associated with the anhydrous (or less hydrated) form provides a mechanism for breaking these crystal bridges due to the reduction in crystal volume. This allows that a period of low temperature does not negatively and permanently affect the structure of the powder and contributes to good handling properties of the composition.

Preferred efflorescent materials for use herein include sulphate and citrates, especially preferred for use herein is sodium sulphate.

Additional Cleaning Actives

Any cleaning ingredient can be used as part of any of the compositions of the invention. The compositions, either the first or the second composition can be phosphate built or free of phosphate builder and in addition to the halogen bleach, enzyme and bleach scavenger can comprise one or more detergent active components which may be selected from surfactants, bleach activator, bleach catalyst, alkalinity sources, organic polymers, anti-corrosion agents and care agents. Highly preferred cleaning components for use herein include a surfactant, a builder, an organic polymer and a care agent.

Surfactant

Surfactants suitable for use herein include non-ionic surfactants. Traditionally, non-ionic surfactants have been used in automatic dishwashing for surface modification purposes in particular for sheeting to avoid filming and spotting and to improve shine. It has been found that non-ionic surfactants can also contribute to prevent redeposition of soils.

Preferably the composition of the invention comprises a non-ionic surfactant or a non-ionic surfactant system, more preferably the non-ionic surfactant or a non-ionic surfactant system has a phase inversion temperature, as measured at a concentration of 1% in distilled water, between 40 and 70° C., preferably between 45 and 65° C. By a "non-ionic surfactant system" is meant herein a mixture of two or more non-ionic surfactants. Preferred for use herein are non-ionic surfactant systems. They seem to have improved cleaning and finishing properties and better stability in product than single non-ionic surfactants.

Phase inversion temperature is the temperature below which a surfactant, or a mixture thereof, partitions preferentially into the water phase as oil-swollen micelles and above which it partitions preferentially into the oil phase as water swollen inverted micelles. Phase inversion temperature can be determined visually by identifying at which temperature cloudiness occurs.

The phase inversion temperature of a non-ionic surfactant or system can be determined as follows: a solution containing 1% of the corresponding surfactant or mixture by weight of the solution in distilled water is prepared. The solution is stirred gently before phase inversion temperature analysis to ensure that the process occurs in chemical equilibrium. The phase inversion temperature is taken in a thermostable bath by immersing the solutions in 75 mm sealed glass test tube. To ensure the absence of leakage, the test tube is weighed before and after phase inversion temperature measurement. The temperature is gradually increased at a rate of less than 1° C. per minute, until the temperature reaches a few degrees below the pre-estimated phase inversion temperature. Phase inversion temperature is determined visually at the first sign of turbidity.

Preferred for use herein is an alcohol alkoxylated. An alcohol alkoxylated is a compound obtained by the condensation of alkylene oxide groups with an organic hydrophobic material which may be aliphatic or alkyl aromatic in nature, preferably is a compound selected from the group consisting of a C2-C18 alcohol alkoxylate having EO, PO and/or BO moieties. The moieties can be in block configuration or randomly distributed.

Preferably the alcohol alkoxylated is an alcohol ethoxylated, substantially free of other alkoxylated groups (i.e. less than 10%, more preferably less than 5% and especially less than 1% of alkoxylated groups other than ethoxy groups). Suitable herein are primary alcohols having preferably from 8 to 18 carbon atoms and on average from 1 to 12 mol of ethylene oxide (EO) per mole of alcohol in which the alcohol radical may be linear or 2-methyl-branched, or may contain a mixture of linear and methyl-branched radicals, as are typically present in oxo alcohol radicals. Preferred alcohol ethoxylated have linear radicals of alcohols of natural origin having from 12 to 18 carbon atoms, for example, of coconut, palm, tallow fat or oleyl alcohol, and on average from 2 to 8 EO per mole of alcohol. Preferred ethoxylated alcohols include, for example, C12-14-alcohols having 3 E0 or 4 EO, C9-11-alcohol having 7 EO, C13-15-alcohols having 3 EO, 5 EO, 7 E0 or 8 EO, C12-18-alcohols having 3 EO, 5 EO or 7 EO and mixtures thereof, such as mixtures of C12-14-alcohol having 3 EO and C12-18-alcohol having 5 EO. The degrees of ethoxylation specified are statistical average values which may be an integer or a fraction for a specific product. Preferred alcohol ethoxylates have a narrowed homolog distribution (narrow range ethoxylates, NRE). In addition to these surfactants, it is also possible to use fatty alcohols having more than 12 EO. Examples thereof are tallow fatty alcohol having 14 EO, 25 EO, 30 EO or 40 EO.

Particularly preferred are the condensation products of alcohols having an alkyl group containing from about 8 to about 14 carbon atoms with an average of from about 6 to about 8 moles of ethylene oxide per mole of alcohol. Preferably at least 25%, more preferably at least 75% of the surfactant is a straight-chain ethoxylated primary alcohol. It is also preferred that the HLB (hydrophilic-lipophilic balance) of the alcohol alkoxylated be less than about 18, preferably less than about 15 and even more less than 14. Commercially available products for use herein include Lutensol®TO series, C13 oxo alcohol ethoxylated, supplied by BASF, especially suitable for use herein being Lutensol®TO7.

Other suitable alcohol ethoxylated surfactants for use herein are C2-C18 alcohol alkoxylated having EO, PO and/or BO moieties having either random or block distribution. Especially preferred for use herein is a surfactant system comprising an ethoxylated alcohol, preferably a C10-C16 alcohol having from 4 to 10 ethoxy groups. Preferably, the alkoxylated alcohol is in a level of from about 0.1% to about 20%, preferably from about 1% to about 10% and more preferably from about 4% to about 8% by weight of the detergent composition.

Other suitable alkoxylated alcohols for use herein include a C2-C18 alcohol alkoxylate having EO, PO and/or BO moieties, specially a C2-C18 alcohol comprising EO and BO moieties in a random configuration. Particularly preferred are the following fatty alcohol alkoxylates such as Adekanol B2020 (Adeka), Dehypon LS36 (Cognis), Plurafac LF 221 (C13-15, EO/BO (95%)), Plurafac LF 300, Plurafac LF 303 (EO/PO), Plurafac LF1300, Plurafac LF224, Degressal SD 20 (polypropoxylate) (all from BASF), Surfonic LF 17 (C12-18 ethoxylated propoxylated alcohol, Huntsman), Triton EF 24 (Dow), Neodol ethoxylates from Shell.

Also suitable for use herein are polyoxyalkene condensates of aliphatic carboxylic acids, whether linear- or branched-chain and unsaturated or saturated, especially ethoxylated and/or propoxylated aliphatic acids containing from about 8 to about 18 carbon atoms in the aliphatic chain and incorporating from about 2 to about 50 ethylene oxide and/or propylene oxide units. Suitable carboxylic acids include coconut" fatty acids (derived from coconut oil) which contain an average of about 12 carbon atoms, "tallow" fatty acids (derived from tallow-class fats) which contain an average of about 18 carbon atoms, palmitic acid, myristic acid, stearic acid and lauric acid.

Also suitable for use herein are polyoxyalkene condensates of aliphatic alcohols, whether linear- or branched-chain and unsaturated or saturated, especially ethoxylated and/or propoxylated aliphatic alcohols containing from about 6 to about 24 carbon atoms and incorporating from about 2 to about 50 ethylene oxide and/or propylene oxide units. Suitable alcohols include "coconut" fatty alcohol, "tallow" fatty alcohol, lauryl alcohol, myristyl alcohol and oleyl alcohol.

Other example types of nonionic surfactants are linear fatty alcohol alkoxylates with a capped terminal group, as described in U.S. Pat. No. 4,340,766 to BASF.

Other example type includes olyoxyethylene-polyoxypropylene block copolymers haying formula:

HO(CH2CH2O)*a*(CH(CH3)CH2O)*b*(CH2CH2O)*c*H;

or

HO(CH(CH3)CH2O)*d*(CH2CH2O)*e*(CH(CH3)CH2O)H wherein a, b, c, d, e and f are integers from 1 to 350 reflecting the respective polyethylene oxide and polypropylene oxide blocks of said polymer. The polyoxyethylene component of the block polymer constitutes at least about 10% of the block polymer. The material can for instance have a molecular weight of between about 1,000 and about 15,000, more specifically from about 1,500 to about 6,000. These materials are well-known in the art. They are available under the trademark "Pluronic" and "Pluronic R", from BASF Corporation.

Suitable nonionic surfactants include: i) ethoxylated nonionic surfactants prepared by the reaction of a monohydroxy alkanol or alkyphenol with 6 to 20 carbon atoms with preferably at least 12 moles particularly preferred at least 16 moles, and still more preferred at least 20 moles of ethylene oxide per mole of alcohol or alkylphenol; ii) alcohol alkoxylated surfactants having a from 6 to 20 carbon atoms and at least one ethoxy and propoxy group. Preferred for use herein are mixtures of surfactants i) and ii).

Another suitable non-ionic surfactants are epoxy-capped poly(oxyalkylated) alcohols represented by the formula:

R1O[CH2CH(CH3)O]*x*[CH2CH2O]*y*[CH2CH(OH)R2] (I)

wherein R1 is a linear or branched, aliphatic hydrocarbon radical having from 4 to 18 carbon atoms; R2 is a linear or branched aliphatic hydrocarbon radical having from 2 to 26 carbon atoms; x is an integer having an average value of from 0.5 to 1.5, more preferably about 1; and y is an integer having a value of at least 15, more preferably at least 20.

Preferably, the surfactant of formula I, at least about 10 carbon atoms in the terminal epoxide unit [CH2CH(OH)R2]. Suitable surfactants of formula I, according to the present invention, are Olin Corporation's POLY-TERGENT® SLF-18B nonionic surfactants, as described, for example, in WO 94/22800, published Oct. 13, 1994 by Olin Corporation.

Amine oxides surfactants useful herein include linear and branched compounds having the formula:

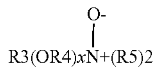

wherein R3 is selected from an alkyl, hydroxyalkyl, acylamidopropoyl and alkyl phenyl group, or mixtures thereof, containing from 8 to 26 carbon atoms, preferably 8 to 18 carbon atoms; R4 is an alkylene or hydroxyalkylene group containing from 2 to 3 carbon atoms, preferably 2 carbon atoms, or mixtures thereof; x is from 0 to 5, preferably from 0 to 3; and each R5 is an alkyl or hydroxyalkyl group containing from 1 to 3, preferably from 1 to 2 carbon atoms, or a polyethylene oxide group containing from 1 to 3, preferable 1, ethylene oxide groups. The R5 groups can be attached to each other, e.g., through an oxygen or nitrogen atom, to form a ring structure.

These amine oxide surfactants in particular include C10-C18 alkyl dimethyl amine oxides and C8-C18 alkoxy ethyl dihydroxyethyl amine oxides. Examples of such materials include dimethyloctylamine oxide, diethyldecylamine oxide, bis-(2-hydroxyethyl)dodecylamine oxide, dimethyldodecylamine oxide, dipropyltetradecylamine oxide, methylethylhexadecylamine oxide, dodecylamidopropyl dimethylamine oxide, cetyl dimethylamine oxide, stearyl dimethylamine oxide, tallow dimethylamine oxide and dimethyl-2-hydroxyoctadecylamine oxide. Preferred are C10-C18 alkyl dimethylamine oxide, and C10-18 acylamido alkyl dimethylamine oxide.

Surfactants may be present in the first and second composition in amounts of from 0 to 10% by weight, preferably from 0.1% to 10%, and most preferably from 0.25% to 6% by weight of the corresponding composition.

Alkalinity Source

Preferred alkalinity sources for use herein include alkali metal hydroxides, especially sodium hydroxide, carbonate, silicate and mixtures thereof. Preferred silicates are sodium silicates such as sodium disilicate, sodium metasilicate and crystalline phyllosilicates. Preferably the first composition comprises an alkalinity source to promote soil hydration and to favour conditions for the halogen bleach to act. Preferably the compositions of the invention comprise from 0 to 60% by weight, preferably from 0.1% to 50%, and most preferably from 0.25% to 6% by weight of the corresponding composition.

Builder

Builders for use herein include phosphate and not phosphate builders. If present, builders are used in a level of from 5 to 60%, more preferably from 10 to 50% by weight of the composition. In some embodiments the product comprises a mixture of inorganic and organic builders. Preferably the second composition comprises a builder, more preferably a non-phosphate builder.

Phosphate Builders

Preferred phosphate builders include mono-phosphates, di-phosphates, tri-polyphosphates or oligomeric-poylphosphates. The alkali metal salts of these compounds are preferred, in particular the sodium salts. An especially preferred builder is sodium tripolyphosphate (STPP).

Non-Phosphate Builder (Sometimes Herein Referred as Organic Builders)

Preferred organic builders include amino acid based compounds, in particular MGDA (methyl-glycine-diacetic acid), GLDA (glutamic-N,N-diacetic acid), iminodisuccinic acid (IDS), carboxymethyl inulin and salts and derivatives thereof. Preferably MGDA or GLDA are present in the first or second compositions of the invention, preferably in the second composition, in a level of from 0.5% to 50%, more preferably from about 1% to about 20% and especially from about 2 to about 10% by weight of the composition. GLDA (salts and derivatives thereof) is especially preferred according to the invention, with the tetrasodium salt thereof being especially preferred.

Other suitable organic builders include amino acid based compound or a succinate based compound. The term "succinate based compound" and "succinic acid based compound" are used interchangeably herein. Other suitable builders are described in U.S. Pat. No. 6,426,229. Particular suitable builders include; for example, aspartic acid-N-monoacetic acid (ASMA), aspartic acid-N,N-diacetic acid (ASDA), aspartic acid-N— monopropionic acid (ASMP), iminodisuccinic acid (IDA), N-(2-sulfomethyl) aspartic acid (SMAS), N-(2-sulfoethyl) aspartic acid (SEAS), N-(2-sulfomethyl) glutamic acid (SMGL), N-(2-sulfoethyl) glutamic acid (SEGL), IDS (iminodiacetic acid) and salts and derivatives thereof such as N-methyliminodiacetic acid (MIDA), alpha-alanine-N,N-diacetic acid (alpha-ALDA), serine-N,N-diacetic acid (SEDA), isoserine-N,N-diacetic acid (ISDA), phenylalanine-N,N-diacetic acid (PHDA), anthranilic acid-N,N-diacetic acid (ANDA), sulfanilic acid-N,N-diacetic acid (SLDA), taurine-N,N-diacetic acid (TUDA) and sulfomethyl-N,N-diacetic acid (SMDA) and alkali metal salts or ammonium salts thereof.

Carboxymethyl inulin is also a non-phosphate builder suitable for use herein. Carboxymethyl inulin is a carboxyl-containing fructan where the carboxyl is carboxymethyl and the fructan has β-2,1 bond. The carboxymethyl inulin is typically supplied as an alkali metal salt such as sodium carboxymethyl inulin. A suitable source of the carboxymethyl inulin is Dequest SPE 15625 from Thermphos International. The carboxymethyl inulin may have a degree of substitution ranging from about 1.5 to about 3, and may in some embodiments be about 2.5.

Preferably the organic builder is present in the first or second (preferably the first) composition in an amount of at least 1%, more preferably at least 5%, even more preferably at least 10%, and most especially at least 20% by weight of the corresponding composition. Preferably these builders are present in an amount of up to 50%, more preferably up to 45%, even more preferably up to 40%, and especially up to 35% by weight of the corresponding composition. In preferred embodiments the composition contains 20% by weight of the corresponding composition or less of phosphate builders, more preferably 10% by weight of the corresponding composition or less, most preferably they are substantially free of phosphate builders.

Other organic builders include polycarboxylic acids. Suitable polycarboxylic acids are acyclic, alicyclic, heterocyclic and aromatic carboxylic acids, in which case they contain at least two carboxyl groups which are in each case separated from one another by, preferably, no more than two carbon atoms. Polycarboxylates which comprise two carboxyl groups include, for example, water-soluble salts of, malonic acid, (ethyl enedioxy) diacetic acid, maleic acid, diglycolic acid, tartaric acid, tartronic acid and fumaric acid. Polycarboxylates which contain three carboxyl groups include, for example, water-soluble citrate. Correspondingly, a suitable hydroxycarboxylic acid is, for example, citric acid. Other suitable builders are disclosed in WO 95/01416, to the contents of which express reference is hereby made.

Organic Polymer

The polymer, if present, is used in any suitable amount from about 0.1% to about 50%, preferably from 0.5% to about 20%, more preferably from 1% to 10% by weight of the composition. Preferably the organic polymer is presents in the second composition.

Preferred organic polymers herein include acrylic acid containing polymers such as Sokalan PA30, PA20, PA15, PA10 and Sokalan CP10 (BASF GmbH), Acusol 45N, 480N, 460N (Rohm and Haas), acrylic acid/maleic acid copolymers such as Sokalan CP5 and acrylic/methacrylic copolymers. Preferred soil release polymers herein include alkyl and hydroxyalkyl celluloses (U.S. Pat. No. 4,000,093), polyoxyethylenes, polyoxypropylenes and copolymers thereof, and nonionic and anionic polymers based on terephthalate esters of ethylene glycol, propylene glycol and mixtures thereof.

Sulfonated/carboxylated polymers are particularly suitable for the compositions, preferably the second composition of the invention.

Suitable sulfonated/carboxylated polymers described herein may have a weight average molecular weight of less than or equal to about 100,000 Da, or less than or equal to about 75,000 Da, or less than or equal to about 50,000 Da, or from about 3,000 Da to about 50,000, preferably from about 5,000 Da to about 45,000 Da.

As noted herein, the sulfonated/carboxylated polymers may comprise (a) at least one structural unit derived from at least one carboxylic acid monomer having the general formula (I):

(I)

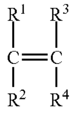

wherein $R^1$ to $R^4$ are independently hydrogen, methyl, carboxylic acid group or $CH_2COOH$ and wherein the carboxylic acid groups can be neutralized; (b) optionally, one or more structural units derived from at least one nonionic monomer having the general formula (II):

(II)

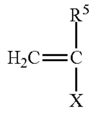

wherein $R^5$ is hydrogen, $C_1$ to $C_6$ alkyl, or $C_1$ to $C_6$ hydroxyalkyl, and X is either aromatic (with $R^5$ being hydrogen or methyl when X is aromatic) or X is of the general formula (III):

(III)

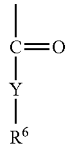

wherein $R^6$ is (independently of $R^5$) hydrogen, $C_1$ to $C_6$ alkyl, or $C_1$ to $C_6$ hydroxyalkyl, and Y is O or N; and at least one structural unit derived from at least one sulfonic acid monomer having the general formula (IV):

(IV)

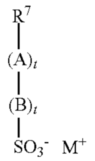

wherein R7 is a group comprising at least one sp2 bond, A is O, N, P, S or an amido or ester linkage, B is a mono- or polycyclic aromatic group or an aliphatic group, each t is independently 0 or 1, and M+ is a cation. In one aspect, R7 is a C2 to C6 alkene. In another aspect, R7 is ethene, butene or propene.

Preferred carboxylic acid monomers include one or more of the following: acrylic acid, maleic acid, itaconic acid, methacrylic acid, or ethoxylate esters of acrylic acids, acrylic and methacrylic acids being more preferred. Preferred sulfonated monomers include one or more of the following: sodium (meth) allyl sulfonate, vinyl sulfonate, sodium phenyl (meth) allyl ether sulfonate, or 2-acrylamido-methyl propane sulfonic acid. Preferred non-ionic monomers include one or more of the following: methyl (meth)acrylate, ethyl (meth) acrylate, t-butyl (meth)acrylate, methyl (meth) acrylamide, ethyl (meth) acrylamide, t-butyl (meth) acrylamide, styrene, or $\alpha$-methyl styrene.

Preferably, the polymer comprises the following levels of monomers: from about 40 to about 90%, preferably from about 60 to about 90% by weight of the polymer of one or more carboxylic acid monomer; from about 5 to about 50%, preferably from about 10 to about 40% by weight of the polymer of one or more sulfonic acid monomer; and optionally from about 1% to about 30%, preferably from about 2 to about 20% by weight of the polymer of one or more non-ionic monomer. An especially preferred polymer comprises about 70% to about 80% by weight of the polymer of at least one carboxylic acid monomer and from about 20% to about 30% by weight of the polymer of at least one sulfonic acid monomer.

The carboxylic acid is preferably (meth)acrylic acid. The sulfonic acid monomer is preferably one of the following: 2-acrylamido methyl-1-propanesulfonic acid, 2-methacrylamido-2-methyl-1-propane sulfonic acid, 3-methacrylamido-2-hydroxypropanesulfonic acid, allysulfonic acid, methallysulfonic acid, allyloxybenzenesulfonic acid, methallyloxybenzensulfonic acid, 2-hydroxy-3-(2-propenyloxy)propanesulfonic acid, 2-methyl-2-propene-1-sulfonic acid, styrene sulfonic acid, vinylsulfonic acid, 3-sulfopropyl acrylate, 3-sulfopropyl methacrylate, sulfomethylacrylamid, sulfomethylmethacrylamide, and water soluble salts thereof. The unsaturated sulfonic acid monomer is most preferably 2-acrylamido-2-propanesulfonic acid (AMPS).

Preferred commercial available polymers include: Alcosperse 240, Aquatreat AR 540 and Aquatreat MPS supplied by Alco Chemical; Acumer 3100, Acumer 2000, Acusol 587G and Acusol 588G supplied by Rohm & Haas; Goodrich K-798, K-775 and K-797 supplied by BF *Goodrich; and ACP* 1042 supplied by ISP technologies Inc. Particularly preferred polymers are Acusol 587G and Acusol 588G supplied by Rohm & Haas.

In the polymers, all or some of the carboxylic or sulfonic acid groups can be present in neutralized form, i.e. the acidic hydrogen atom of the carboxylic and/or sulfonic acid group in some or all acid groups can be replaced with metal ions, preferably alkali metal ions and in particular with sodium ions.

Other suitable organic polymer for use herein includes a polymer comprising an acrylic acid backbone and alkoxylated side chains, said polymer having a molecular weight of from about 2,000 to about 20,000, and said polymer having from about 20 wt % to about 50 wt % of an alkylene oxide. The polymer should have a molecular weight of from about 2,000 to about 20,000, or from about 3,000 to about 15,000, or from about 5,000 to about 13,000. The alkylene oxide (AO) component of the polymer is generally propylene oxide (PO) or ethylene oxide (EO) and generally comprises from about 20 wt % to about 50 wt %, or from about 30 wt % to about 45 wt %, or from about 30 wt % to about 40 wt % of the polymer. The alkoxylated side chains of the water soluble polymers may comprise from about 10 to about 55 AO units, or from about 20 to about 50 AO units, or from about 25 to 50 AO units. The polymers, preferably water soluble, may be configured as random, block, graft, or other known configurations. Methods for forming alkoxylated acrylic acid polymers are disclosed in U.S. Pat. No. 3,880,765.

Other suitable organic polymer for use herein includes polyaspartic acid (PAS) derivatives as described in WO 2009/095645 A1.

Additional Bleaches

Suitable peroxygen bleaches to be used herein include percarbonate, hydrogen peroxide (or water soluble sources thereof), persulfates (such as monopersulfates), persilicates, peroxyacids, alkyl peroxides and acyl peroxides. A hydrogen peroxide source refers to any compound that produces perhydroxyl ions when said compound is in contact with water, such as for instance percarbonates and perborates. Preferred peroxygen bleaches are organic peroxyacids, such as for instance peroxyacetic acid, peroxyoctanoic acid and diperoxydodecandioic acid. A particularly preferred peroxyacid is phtalimidoperoxy hexanoic acid (PAP).

An additional bleach, if present, is used in any suitable amount from about 0.1% to about 50%, preferably from 0.5% to about 20%, more preferably from 1% to 10% by weight of the corresponding composition. Preferably the additional bleach, if present, would be found in the second composition. Preferred additional bleaches for use herein include percarbonate and PAP. If the second composition comprises percarbonate, then it could additionally contain a bleach activator, preferably tetraacetylethylenediamine (TAED)) and/or a bleach catalyst, preferably Mn-Me TACN, as described in EP 458 397 A.

Metal Care Agents

Metal care agents may prevent or reduce the tarnishing, corrosion or oxidation of metals, including aluminium, stainless steel and non-ferrous metals, such as silver and copper.

Preferably the first or second composition of the invention comprises from 0.1 to 5%, more preferably from 0.2 to 4% and specially from 0.3 to 3% by weight of the corresponding composition of a metal care agent, preferably the metal care agent is a zinc salt.

An automatic dishwashing operation typically comprises three or more cycles: a pre-wash cycle, a main-wash cycle and one or more rinse cycles. The pre-wash is usually a cold water cycle, the main-wash is usually a hot water cycle, the water comes in cold and is heated up to about 55 or 65° C. Rinsing usually comprises two or more separate cycles following the main wash, the first being cold and, the final one starting cold with heat-up to about 65° C. or 70° C.

Examples of devices in accordance with the present invention will now be described with reference to the accompanying drawings, in which:

FIGS. 1, 2, 3, 4 and 5 show respective assembled, perspective exploded and internal perspective views of the rotating actuating means 1 comprising the driving means 2 and the guided means 4. The driving means 2 comprises an axes 3 around which the cover with the guided means 4 can rotate at specific intervals defined by the profile of the guided track 10 inside the cover 5.

Figure 13A:
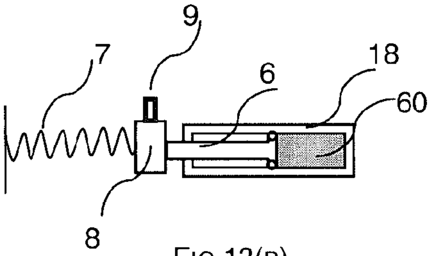
FIG. 13 (*a*) and FIG. 13 (*b*) respectively show a schematic view of the driving means in contracted (cold) position (i.e.
Figure 13B:
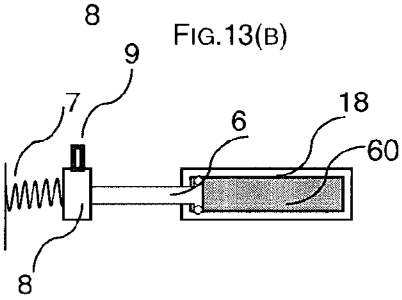

The driving means further comprise a thermal reactive element 18 which is in this configuration a wax motor. As shown in FIG. 13(*a*) a wax motor 18 is basically a cylinder filled with a thermal sensitive wax 60 under a piston 6. When temperature in the automatic dishwashing machine brings the wax to or above its melting temperature it will start to expand as shown in FIG. 13(*b*) This expansion pushes the piston outwards developing a considerable force, up to 50N and more and a considerable movement, or stroke of the piston. For instance for a cylinder with a total length of 30 mm and +/−6 mm diameter half filled with a solid wax under the piston a stroke of the piston of 15 mm can be achieved, meaning an expansion of the wax by a factor 2 upon melting.

Figure 1:
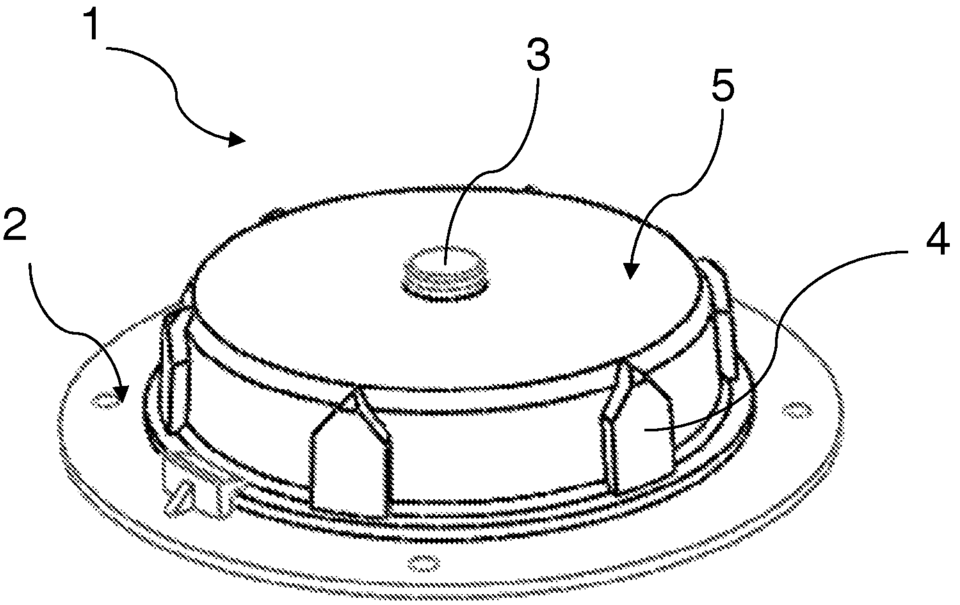
FIG. 1 shows in perspective an assembly view of the actuating means 1 comprising a baseplate with the driving means 2 and a rotating cover 5 with the guided means 4.
Figure 2:
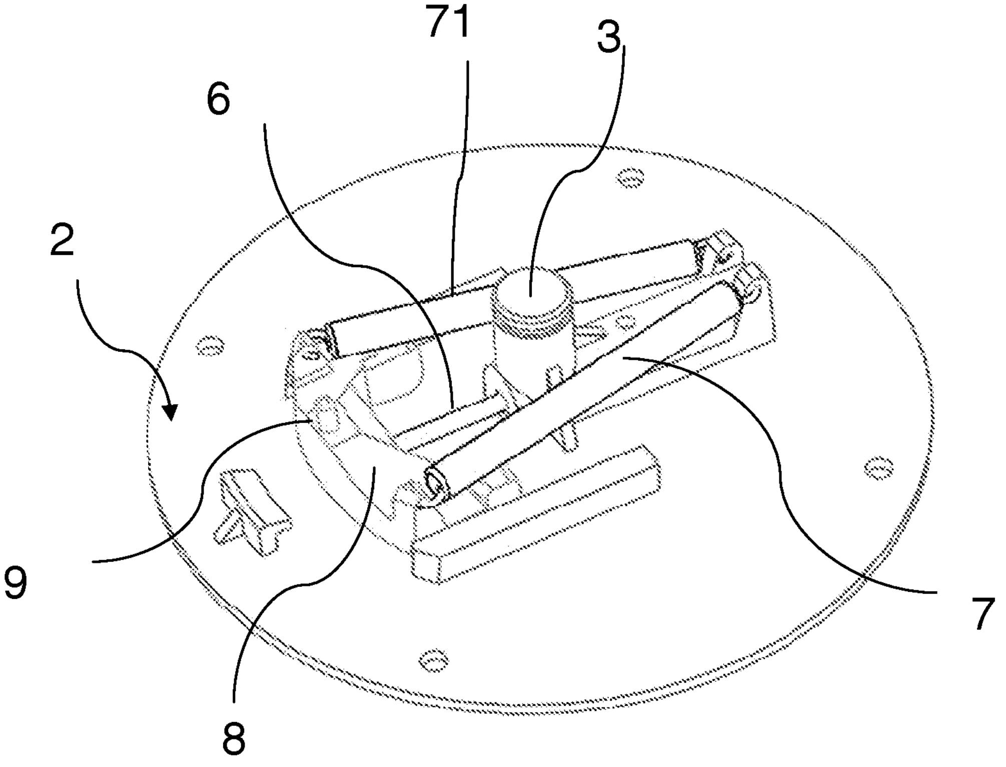
FIG. 2 shows a perspective assembly detail of the driving means 2 with the rotating cover 5 removed.

This outward movement of the piston puts the returning means, which in FIG. 2 are two coil springs 7 and 71, and in FIGS. 13(*a*) and 13(*b*) a single coils spring, under tension.

When the temperature in the dishwasher cools down below the solidification temperature again, at the end of the wash, the wax contracts, allowing the piston 6 to move back. The returning means pushes the piston back into the starting position.

This forwards and backwards movement of the piston or "the stroke" of the wax motor 18 is used to drive the following means 8 with the following pin 9 forward and backwards assisted by the returning means 7 and 71. The returning means, in this case two tension springs 7 and 71 are connected on one side to the following means 8 and on the other side to the static baseplate 2. To achieve a linear and smooth motion forward and backwards the following means run in supporting rails 20 and 22.

It should be noted that the returning means in the form of a compression spring can also be inserted inside of the wax motor 18, above the piston 6 so that upon expansion of the wax the spring compresses and upon cooling it can expand to its starting position.

In one preferred embodiment of the invention this forward and backwards movement of the driving means 18 and following means 8 and following pin 9 can now be used to rotate the cover 5 via the guided means 10 on the inside of this cover.

Figure 3:
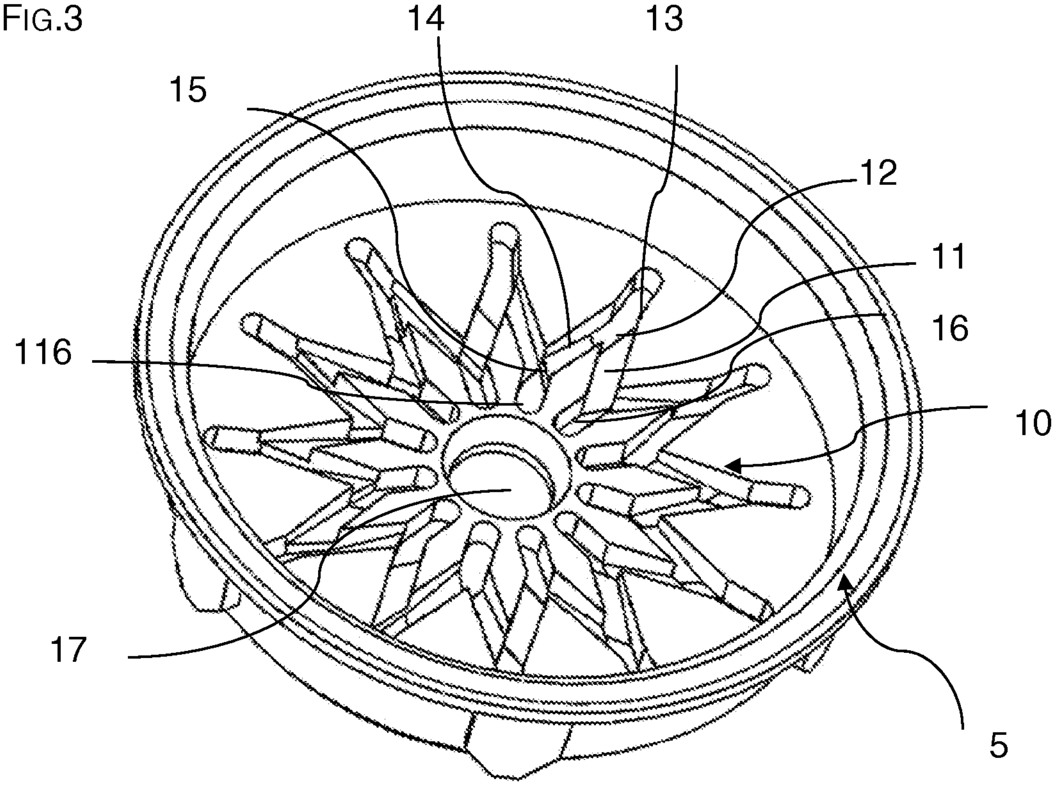
FIG. 3: shows a perspective view of the circular guided means inside the rotating cover 5 with a circular zig-zag track 10.
Figure 4A:
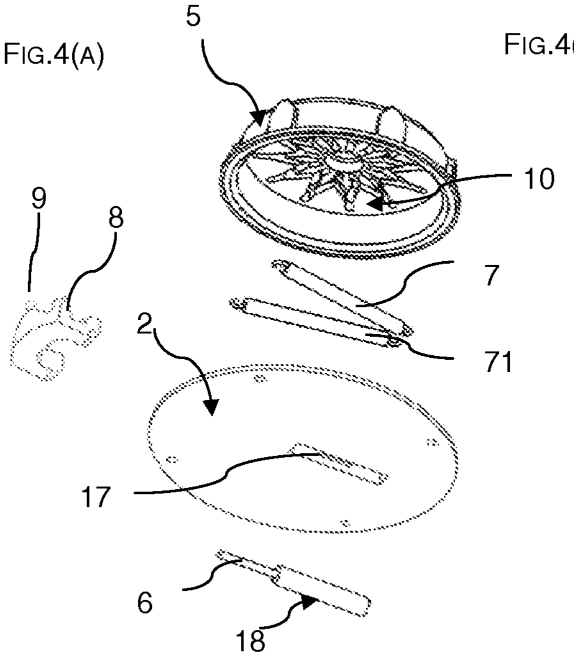
FIGS. 4(*a*) and 4(*b*) are perspective exploded views of the actuating means mechanism with following means 8 with follower pin 9 and returning means 7 and 71.
Figure 4B:
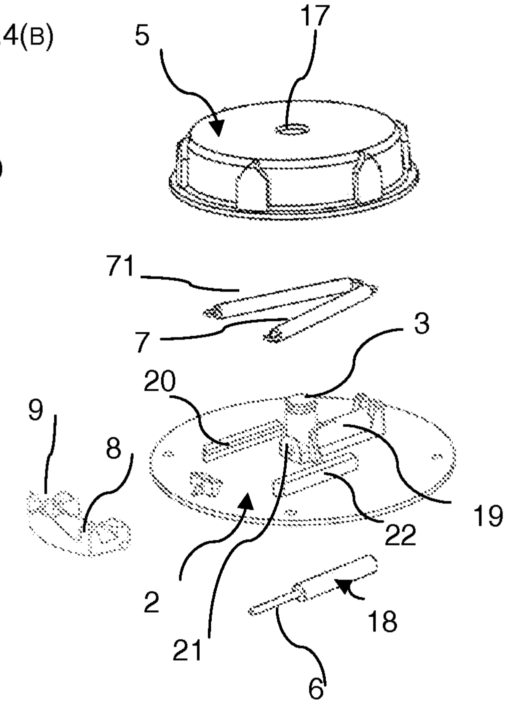
Figure 5:
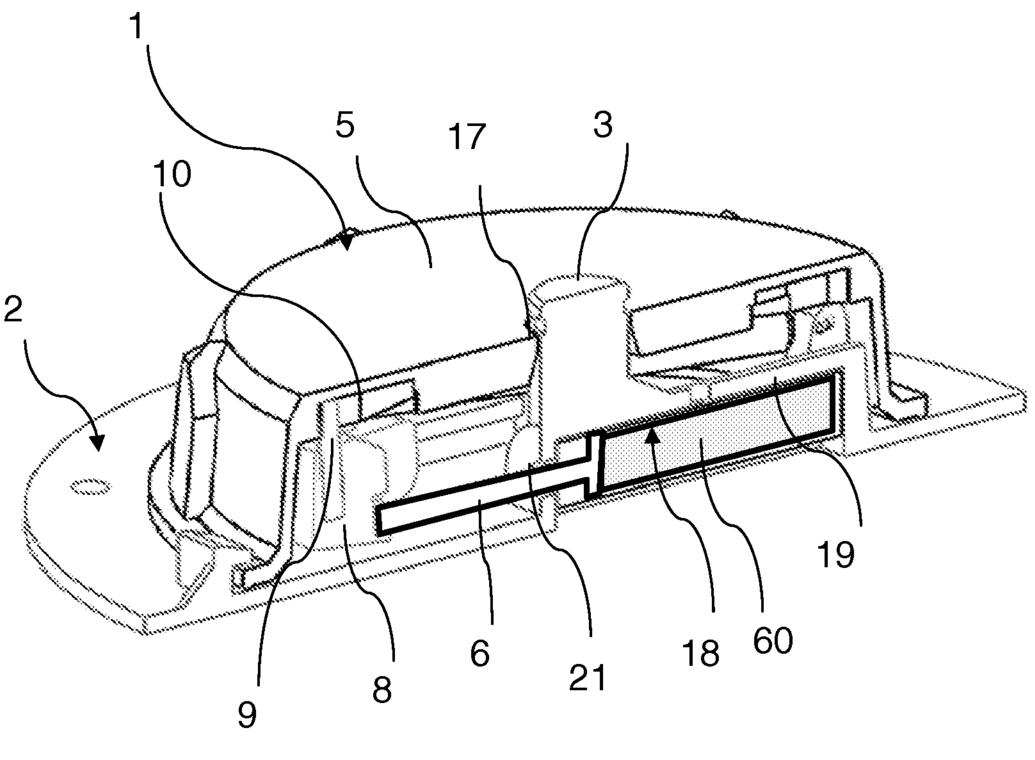
FIG. 5 shows in perspective cross-sectional view the assembled actuating mechanism with waxmotor 18 and follower pin 9 in the expanded position.

FIG. 3 shows a detail of the guided means, in this configuration the guided means 10 are a circular zig-zag repetitive track with harbours 13 and 16, ramps 11 and 14 and slots 12 and 15. The following describes one complete cycle:

At the start of an automatic dishwashing operation the automatic dishwashing machine is cold and the wax motor is contracted with the follower pin 9 positioned in the "cold" harbour 16. When the machine heats up the wax starts to expand when it reaches its melting temperature. This drives the follower pin 9 forward through the first path of the track over the ramp 11 and as such rotates the cover over a certain angle. At further expansion the following pin drops over the ramp into the slot 12 and from there the further expansion drives it into the "warm" harbour 13. The harbour allows the following pin to continue moving till full expansion without causing any further movement to the cover 5.

When the automatic dishwashing machine starts to cool down below the solidification temperature of the wax, the wax motor slowly starts to contract and moves the following pin out of the "warm" harbour 13. The slot 12 prevent that pin can return through the path with ramp 11 and therefore forces the pin to follow the new path over ramp 14 into slot 15 causing a further rotation to the cover 5. The further contraction moves the pin 9 back into the next "cold" harbour 116 where it can fully contract without causing further motion to the cover 5. At this point the actuating device is ready for the next dishwashing operation.

It should be noted that one forward and backward movement through the zig-zag track corresponds with one complete wash program of the dishwashing machine.

In this circular configuration as per FIG. 3 the multiple peaks and valleys on the zig-zag track define the number of detergent dosages that can be provided. The shown configuration can automatically provide detergent over 12 complete dishwashing operations.

Figure 7:
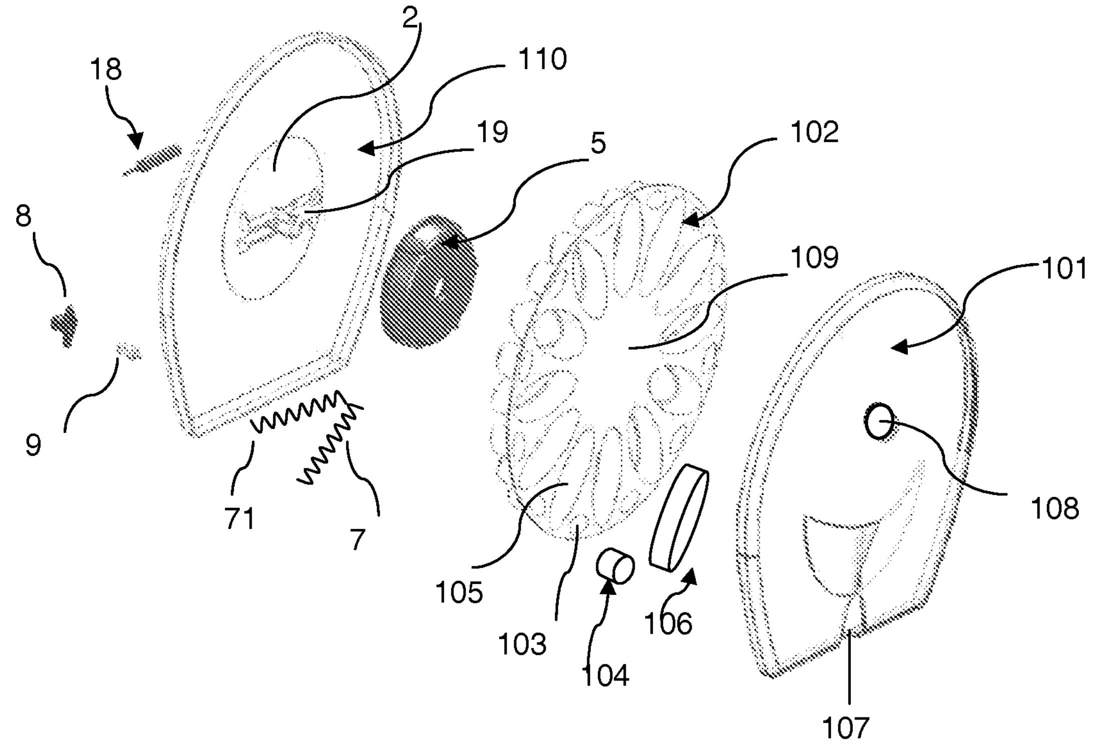
FIG. 7 shows an exploded view of the multi-dosing detergent holder 102 in a disc shaped housing 101 and 110 with the actuating mechanism.
Figure 8:
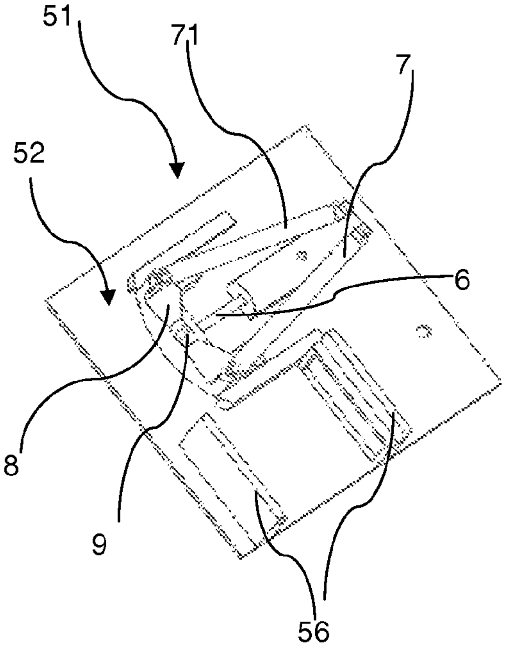
FIG. 8 shows a perspective assembly view of the actuating mechanism 51 for a rectangular shaped guided means.
Figure 9:
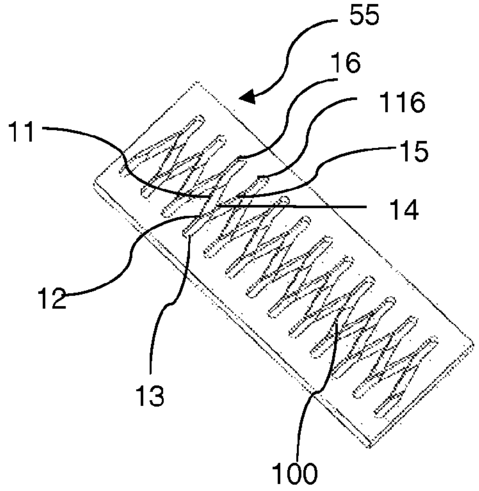
FIG. 9 shows a perspective view of the rectangular guided means 55 with a linear zig-zag track 100.
Figure 10A:
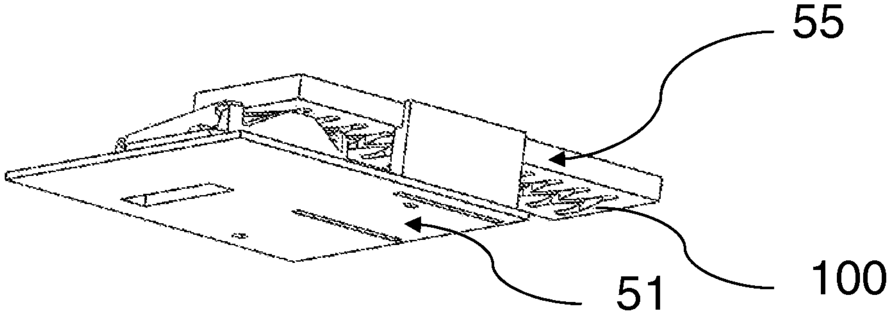
FIGS. 10(*a*) and 10(*b*) show perspective assembly views of the actuating mechanism 51 and the rectangular guided means 55.
Figure 10B:
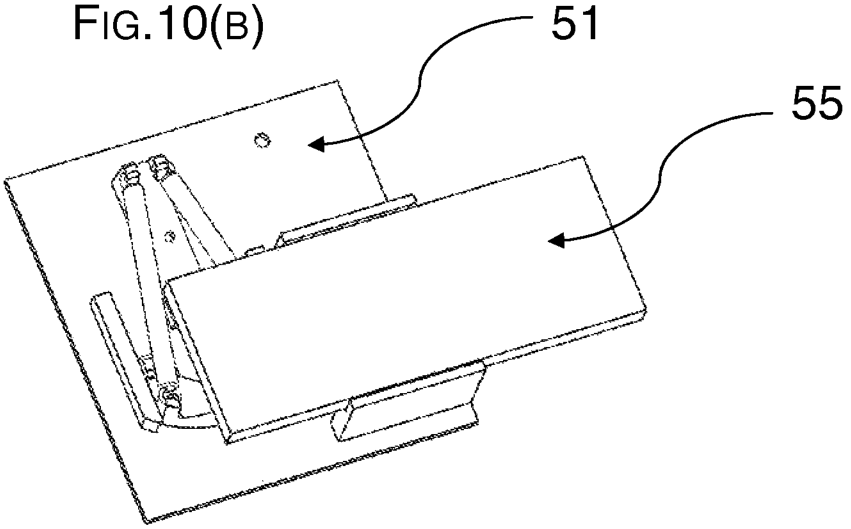

It will now be described how the rotational movement of the cover 5 drives the detergent holder 102 in the housing 110 and 101 shown in exploded perspective view FIG. 7. In this configuration the driving means 2 with the wax motor 18, the returning means 7 and 71 and following means 9 and follower pin 9 are in this case integrated in one half of the housing 110. The rotating cover 5 with guiding means is clipped over it with the follower pin positioned in the first "cold" harbour.

The detergent holder 102 with the multiple detergent doses is inserted in this housing with the bottom engaging with the rotating cover 5. The housing is closed with the second half of the housing 101. The cover 5 can have guiding ribs 4 and other features to easily mate with detergent holder 102 so that the circular movement of the rotating cover can be transferred to the detergent holder throughout the various dishwashing operations.

It should be noted that the configuration of the track 10 and the angles of its zig-zag pattern determine the movement of cover 5 and thus the detergent holder 102. Therefore the movement and desired release points can be dictated by this track. This enables large design flexibility in the delivery of the products at various points during the wash and rinse cycle(s). Even a sequential release of two or more doses can be achieved by the use of this kind of tracks.

In another preferred embodiment the guided means 10 can be directly integrated into the detergent holder 102. In this case there is no need for a rotating cap 5 and the back and forward motion of the driving means can be directly transferred into the rotation of the detergent holder.

It should be noted that in this case the pattern of the track can be flexible and be different for different detergent holders, enabling specific release points in the dishwashing operation tailored to deliver different detergent doses at optimum times in a dishwashing operation.

The zig-zag track 10 in the rotating cap or into the detergent holder can be formed via various techniques known in the art like injection molding, thermoforming, compression molding, laser cutting, etching, galvanising or the like or can be separately produced and fixed to cap or the detergent holder via well known glueing, welding or sealing or mechanical clipping techniques.

The release of the detergent doses can be established in various ways using this multi-dosing detergent delivery device. In one preferred embodiment shown on FIG. 7 a first detergent dose 104 and a second detergent dose 106 are placed in separate cavities 103 and 105 of the detergent holder 102. The detergent holder in this case can contain a non limiting number of 12 doses of the first and 12 doses of the second detergent.

At the start of the dishwashing operation the first detergent 104 can be exposed to the wash liquor in the automatic dishwasher via the open gate 107 in the housing while the other detergent doses are protected from the liquor by the housing. As explained before as the temperature rises the wax in the wax motor 18 expands and the piston 6 drives the follower pin 9 through the track 10 which rotates the detergent holder 102 to the next position where the second detergent 106 gets exposed to wash liquor via the open gate 107. When the machine cools down again the wax motor contracts and rotates the detergent holder to the next position ready for the next wash.

It should be noted that during the rotation more than one detergent dose can be exposed or released sequentially, either direct at the start, in the first prewash, during the main-wash or during the first or second rinse cycle and even during the final heating, drying cycle and cooling cycle by accurately making use of the specific expanding or contracting stroke length of the wax motor in function of temperature. The shape and angles of the zig-zag track then define the rotational speed and rotational angle of the detergent holder.

The first 104 and or second detergent doses 106 can either be exposed to the wash liquor or can be dropped into the dishwashing machine through the open gate 107 using gravity or by actively pushing it out of the cavities 103 and/or 105 by running the detergent holder over a small ramp featured on the inside of the housing 110. This ramp feature applies a gradual increasing force on the underside of the cavity to pop the detergent dose out of the cavities 103 and/or 105 during the rotational movement. In this case a deformable base in the detergent holder like a flexible deep drawn film, a blister pack or thin wall thermoformed cavities will help the release of the first and/or second detergent doses.

In another embodiment the ramp feature can run through one or more open slots in the base of the detergent cavities 103 and/or 105 to actively push the content out through the open gate 107 into the dishwashing machine. In a further variation the housing can have more than one open gate 107.

The first and second detergent doses can be protected against the high humidity and high temperature conditions in the dishwashing machine via additional sealing and barrier features and materials in the housing or by covering the cavities of the detergent holder with a water-soluble PVA film or a non soluble moisture barrier film which can be pierced or torn open during the release operation.

Figure 6A:
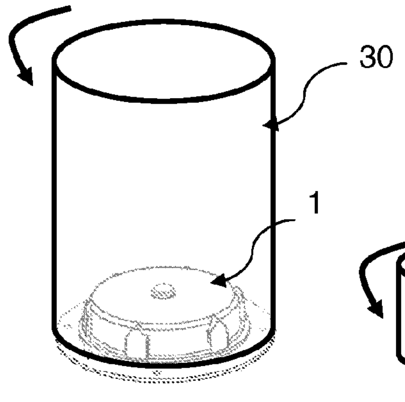
FIGS. 6(*a*) and 6(*b*) shows respectively a schematic perspective of the actuating mechanism in a cylindrical housing and in a planar disc shaped housing
Figure 6B:
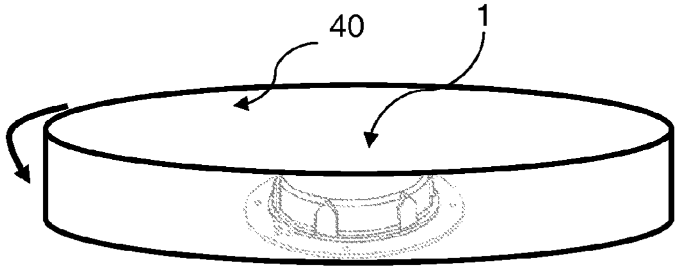

The perspective view in FIGS. 6(*a*) and 6(*b*) illustrate that the actuating means 1 can be used in a cylindrical housing 30 or in a disc shaped housing 40 or any further shape that can accommodate the rotational movement. The detergent holders can also have different shapes to match with these specific housings.

Further means for easy insertion and removal of the detergent holder can be integrated in the housing and the detergent holder, like locking features, clipping features, (spring loaded) opening features, (spring loaded) ejecting features, etc.

Another embodiment of this invention is shown in the perspective assembly, detailed and exploded views shown in FIGS. 8, 9, 10, 11 and 12. The driving means with the wax motor 18 and the forward and backward moving following means 8 and follower pin 9 on the piston 6 are in this configuration transferred into a linear unidirectional motion of the guided plate 55 via the linear zig-zag track 100 with ramps, slots and harbours as described before.

Figure 11:
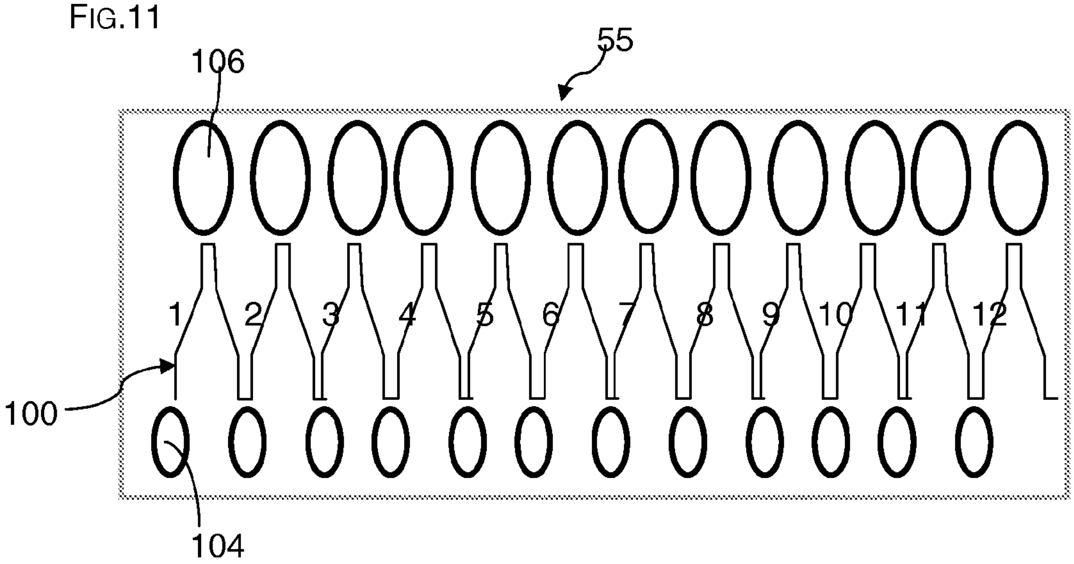
FIG. 11 shows a schematic view of the rectangular shaped multi-dosing detergent holder 55 comprising the guided means with linear track 100 comprising multiple doses of the first detergent composition 104 and the second detergent composition 106.
Figure 12:
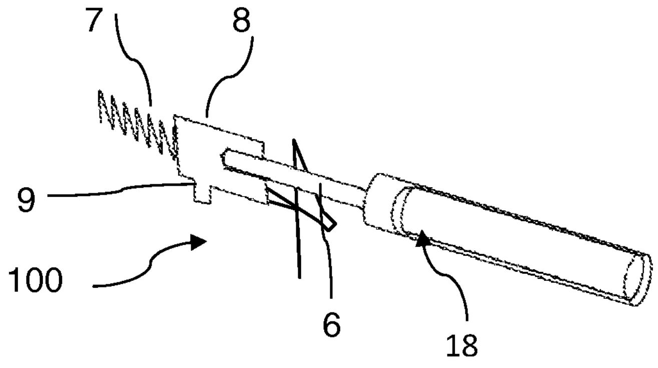
FIG. 12 shows a perspective detailed schematic view of the driving means 18 driving the following means 8 with follower pin 9 through the linear track 100 of FIG. 11.

As shown in FIG. 11 this linear zig-zag track 100 can be integrated into a rectangular shaped detergent holder 55 with a number of individual cavities containing the first 104 and second detergent doses 106. As described before each up and down path through the track 100 corresponds with a heating and cooling phase during the dishwashing operation. Two or more detergent doses can be delivered one after the other in the dishwashing machine at specific points in the wash. On FIG. 11 detergent doses for twelve different dishwashing operations are shown however it should be understood that this can easily be varied from 2 to 36 or more dishwashing operations, depending on the size of the detergent holder.

In a preferred embodiment of the invention this rectangular shaped detergent holder is a blister pack.

The automatic dishwashing detergent delivery system of the invention can have further features to indicate the number of doses used or still left to help the consumer decide when to refill the detergent holder. FIG. 7 shows a transparent window 108 on the housing 101 to display one number of a range, printed or marked in a circular pattern on the centre 109 of the detergent holder 102. When the detergent holder rotates, from one dishwashing operation to the next, the number changes behind the window 108. It should be noted that other characters, specific icons or colour coding can be used to communicate how many doses are left.

In more advanced executions of the invention sound or light signals can be generated by for instance storing energy in a coil-spring that slowly winds up with the rotational movement of the detergent holder and releases it energy via a mechanical switch when the detergent holder is almost empty.

In preferred embodiments of the invention a machine fresher composition can be accommodated in each detergent holder, for instance by placing it in a central cavity of the detergent holder to continuously release a perfume or bad odour suppressor into the dishwashing machine over the number of dishwashing operations and in between dishwashing operations. This machine fresher composition can be activated at first use by removing a sealing label or the like covering the cavity.

EXAMPLES

Abbreviations Used in the Example

In the example, the abbreviated component identifications have the following meanings:

NaDCC: sodium dichloroisocyanurate

STPP: Sodium tripolyphosphate anhydrous

MGDA: methyl-glycine-diacetic acid

Silicate: Amorphous Sodium Silicate ($SiO_2$:$Na_2O$=from 2:1 to 4:1)

LF224: Non-ionic surfactant available from BASF

Lutensol TO7: Alkoxylated surfactant available from BASF

| | Composition | |
|---|---|---|
| Ingredient | 1 Level (g) | 2 Level (g) |
| First composition | | |
| NaDCC | 1.9600 | 1.9600 |
| NaOH | 1.3300 | 1.3300 |
| Na2CO3 | 5.0000 | 5.0000 |
| Silicate | 1.0400 | 1.0400 |
| TOTAL | 9.3300 | 9.3300 |
| Second composition | | |
| Protease | 0.0360 | 0.0360 |
| Amylase | 0.0019 | 0.0019 |
| Na2S2O3 | 5.0000 | 5.0000 |
| MGDA | 7.0000 | 3.0000 |
| Citrate Dihydrate | 3.0000 | |
| STPP | | 8.0000 |
| Citric Acid | 0.5000 | |
| Sulfonated polymer | 0.7500 | 0.7500 |
| LF224 | 0.1000 | 0.1000 |
| TO7 | 0.8000 | 0.8000 |
| TOTAL | 17.1879 | 17.6879 |

Compositions 1 and 2 are placed in a detergent holder. The detergent holder is charged in an auto-dosing device according to the invention. A soiled load is washed using composition 1 delivered by the auto-dosing device, the first composition is delivery at the beginning of the main wash cycle, the second composition is delivered five minutes after the first composition. The same operation is repeated with composition 2. In both cases excellent cleaning is obtained.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to the term in this document shall govern.

What is claimed is:

1. An automatic dishwashing product comprising a multi-dosing detergent delivery device for accommodating a plurality of detergent doses wherein the doses comprise at least two different types of detergent compositions, a first composition comprising a halogen bleach and a second composition comprising enzymes and a bleach scavenger, wherein the multi-dosing detergent delivery device comprises a rotating actuating means and a returning means, the rotating actuating means comprising a driving means and a guided means; wherein the driving means comprises an axis around which a cover with the guided means can rotate inside of the cover; wherein the guided means comprises a circular zig-zag track having a warm harbor and a cold harbor, ramps, and slots; and wherein the driving means further comprises a cylinder filled with wax under a piston; and wherein the returning means comprises two coil springs under the piston.

2. The product according to claim 1 wherein the halogen bleach is a chlorine bleach.

3. The product according to claim 1 wherein the first composition further comprises an alkalinity source.

4. The product according to claim 1 wherein the bleach scavenger is thiosulphate.

5. The product according to claim 1 wherein the first and the second compositions are free of phosphate builder.

6. A method of automatic dishwashing comprising the step of using the automatic dishwashing product according to claim 1 to sequentially deliver the first and the second composition.

* * * * *